US007525946B2

(12) United States Patent
Sebire

(10) Patent No.: US 7,525,946 B2
(45) Date of Patent: Apr. 28, 2009

(54) SYSTEM AND METHOD FOR DECODING SIGNALLING MESSAGES ON FLO HR CHANNELS

(75) Inventor: Benoist Sebire, Beijing (CN)

(73) Assignee: Nokia Corporation, Espoo (FI)

( * ) Notice: Subject to any disclaimer, the term of this patent is extended or adjusted under 35 U.S.C. 154(b) by 218 days.

(21) Appl. No.: 11/199,531

(22) Filed: Aug. 8, 2005

(65) Prior Publication Data

US 2006/0039325 A1 Feb. 23, 2006

Related U.S. Application Data

(60) Provisional application No. 60/603,482, filed on Aug. 20, 2004, provisional application No. 60/614,754, filed on Sep. 30, 2004.

(51) Int. Cl.
 *H04J 1/00* (2006.01)
(52) U.S. Cl. .................. 370/343; 370/342; 370/345; 370/329; 370/473
(58) Field of Classification Search .......... 370/329, 370/342, 473, 478, 236, 265, 300, 218, 490, 370/412; 375/136–137, 240.24, 240.2, 261; 455/70, 560, 456.5, 450, 67.1, 67.3, 37.4
See application file for complete search history.

(56) References Cited

U.S. PATENT DOCUMENTS

| 6,400,928 | B1 * | 6/2002 | Khullar et al. ........... 455/67.11 |
| 6,795,412 | B1 * | 9/2004 | Lee ........................ 370/329 |
| 6,865,233 | B1 * | 3/2005 | Eriksson et al. ............ 375/261 |
| 7,079,489 | B2 * | 7/2006 | Massie et al. .............. 370/236 |
| 2002/0154612 | A1 * | 10/2002 | Massie et al. .............. 370/329 |
| 2003/0072266 | A1 * | 4/2003 | Uesugi et al. .............. 370/236 |
| 2004/0042492 | A1 * | 3/2004 | Suzuki et al. .............. 370/473 |
| 2004/0083300 | A1 * | 4/2004 | Toda ......................... 709/230 |
| 2004/0109422 | A1 * | 6/2004 | Naito ........................ 370/328 |
| 2004/0152468 | A1 * | 8/2004 | Sebire ....................... 455/450 |
| 2004/0228315 | A1 * | 11/2004 | Malkamaki ................. 370/342 |

(Continued)

OTHER PUBLICATIONS

Global System for Mobile Communications; 3rd Generation Partnership Project; Technical Specification Group GSM/EDGE Radio Access Network; Physical layer on the radio path; General description (Release 6) 3GPP TS 45.001 V6.5.0 (Nov. 2004).

(Continued)

*Primary Examiner*—Tan Trinh
(74) *Attorney, Agent, or Firm*—Harrington & Smith, PC

(57) ABSTRACT

A method for decoding signalling messages on Flexible Layer One (FLO) half rate channels, wherein soft values of blocks that are incorrectly received are stored in a buffer. When the cyclic redundancy check (CRC) data of a received block fails, the soft values of the block are stored along with the first half of a signalling message so as to facilitate soft combining. The information from the first half of a signalling message that is used in the combination is the first radio packet for which the TFCI is a signalling TFCI, i.e., its value is 0. As a result, a misread of the first and second TFCI of a signalling message can occur without adversely affecting the decoding of a transmitted radio packet. In addition, the ability to decode errors within the TFCI that precedes the signalling message without having an adverse impact on the signalling message is achieved.

35 Claims, 2 Drawing Sheets

U.S. PATENT DOCUMENTS

2006/0092973 A1* 5/2006 Petrovic et al. ............. 370/469
2007/0106924 A1* 5/2007 Seidel et al. ................ 714/748

OTHER PUBLICATIONS

Global System for Mobile Communications; 3rd Generation Partnership Project; Technical Specification Group GSM/EDGE Radio Access Network; Flexible Layer One (Release 6) 3GPP TR 45.902 V6.6.0 (Jun. 2004).

Global System for Mobile Communications; 3rd Generation Partnership Project; Technical Specification Group GSM/EDGE Radio Access Network; Channel coding (Release 4) 3GPP TS 45.003 V4.2.0 (Apr. 2003).

* cited by examiner

SYSTEM AND METHOD FOR DECODING SIGNALLING MESSAGES ON FLO HR CHANNELS

RELATED APPLICATIONS

This application claims priority from U.S. Provisional Application Ser. No. 60/603,482 filed Aug. 20, 2004, and U.S. Provisional Application Ser. No. 60/614,754 filed Sep. 30, 2004.

BACKGROUND OF THE INVENTION

1. Field of the Invention

The present invention generally relates to Flexible Layer One (FLO) for the Global System for Mobile Communications (GSM)/Enhanced Data Rates for Global Evolution (EDGE) Radio Access Network (GERAN) and, more particularly to, a system and method for decoding signalling messages on FLO half-rate channels.

2. Detailed Description of the Related Art

Presently, a new layer, i.e., Flexible Layer One (FLO) for the GERAN is being standardized in Release 6 of the Third Generation Partnership Project (3GPP). This standardization is being performed based on the same principles that are used in a Universal Terrestrial Radio Access Network (UTRAN). Instead of utilizing fixed coding schemes, FLO provides a framework that permits a particular coding scheme to be defined and optimized at call setup according to the quality of service (QoS) requirements of the service to be supported, such as IP Multimedia Subsystem (IMS) services.

The main advantage of FLO is that the configuration of the physical layer (for example channel coding and interleaving) is specified at the call setup. As a result, the support of new services can be handled smoothly without the need to specify new coding schemes in each released version of the new services.

Through several enhancements, such as reduced granularity and flexible interleaving, the radio bearers offered by FLO would not only fulfill the IMS requirement for flexibility and performance, but also greatly improve link level performance of real-time IMS services in comparison to the link performance that is achieved in GERAN Release 5. Granularity is the extent to which a system contains separate components, for example, granules. The more components in a system, i.e., the greater the granularity, the more flexible it is.

Control plane messages and Radio Link Control/Medium Access Control (RLC/MAC) messages are signalling messages that are each associated with a specific service. These signalling messages need to be carried with the specific service. Even in adverse channel conditions, the reliable transport of such signalling messages must be achieved throughout a radio access network. As a result, a high level of signalling protection is implemented in GSM communications. For example, throughout every network, as established in 3GPP TS 45.003 V6.5.0 "Radio Access network; Channel Coding," Coding Scheme 1 (CS-1) is always used to guarantee consistent performance in every cell.

The flexibility offered by FLO provides the ability to change the level of signalling protection. It is also possible to multiplex signalling messages with other radio bearers. While this kind of flexibility is desirable in the user plane, it is generally avoided in the control plane because it can lead to inconsistent signalling performance in the network (for example, handover commands become unavailable in certain areas). As established in 3GPP TR 45.902 V6.6.0, "Radio Access network; Flexible Layer One," the configuration of the signalling is fixed in order to guarantee consistent signalling message performance.

A full rate channel relates to the instance where a mobile station (MS) is accessed every 3rd time slot, for example, time slots 1 and 3, time slots 2 and 4, or time slots 3 and 6. With half rate channels, the MS is accessed every 6th time slot. For full rate and half rate channels, the first transport format combination (TFC) of the transport format combination set (TFCS) is used to send signalling messages. Within this first TFC, only the transport channel carrying the transport blocks of the signalling message is active with a fixed transport format (for example, 184 bits of transport block data and 18 bits of cyclic redundancy check (CRC) data).

In the case of full rate channels, the Medium Access Control (MAC) layer sends the signalling transport block once. However, for half rate channels the MAC layer transmits the same signalling transport block twice in a row. Here, coded bits of the same transport block become located in two consecutive radio packets. As a result, the effect is the same as if the interleaving depth was twice the interleaving used for one radio packet. That is, both radio packets possess the same transport format combination indicator (TFCI) at Layer One.

However, the TFCI is the first item that is read by a decoder. As a result, unless double decoding is permitted, the radio packet will be lost if the TFCI is misread. Therefore, there is a need for a decoding procedure for permitting the correct processing of misread TFCIs on half rate channels and for minimizing the effects of misread TFCIs, especially in the transport blocks of signalling messages.

SUMMARY OF THE INVENTION

The present invention is a system and method for decoding signalling messages on Flexible Layer One (FLO) half rate channels. In accordance with the invention, the soft values of blocks that are incorrectly received are stored in a buffer. When the cyclic redundancy check (CRC) data of a received block fails, the soft values of the block are stored along with the first half of a signalling message so as to facilitate soft combining. In other words, when the first radio packet for which the transport format combination (TFC) is a signalling TFCI, i.e., equal to 0, the soft values and the first half of a signalling message are stored to permit soft combining of the data. A soft combination of data occurs when information from an original transmission is combined with the information contained in a subsequent transmission. The information from the first half of a signalling message that is used in the combination is the first radio packet for which the TFCI is a signalling TFCI, i.e., its value is 0.

A transmitted radio packet is received for decoding, and a check of the first transport format combination indicator (TFCI) of the received radio packet is performed to determine its value. If the value of the TFCI is 0, i.e., the TFCI is a signalling TFCI, then a check is performed to determine whether the soft values of the previously received radio packet have been stored in a buffer. If the soft values of the previously received radio packet have been stored in the buffer, they are combined with the soft values of the currently received radio packet. On the other hand, if the soft values of the previously received radio packet have not been stored, the soft values of the currently received radio packet are then stored in the buffer.

If the TFCI is not a signalling TFCI, then a check is performed to determine whether soft values of a previous radio packet have been stored in the buffer and whether the previous TFCI was the signalling TFCI. If soft values of a previous radio packet have been stored in the buffer and the previous TFCI is the signalling TFCI, then the soft values of the received radio packet are combined with the soft values of the previous radio packet that are stored in the buffer, and the received radio packet is then decoded.

If, however, the soft values of the previous radio packet have not been stored in the buffer and the previous TFCI was not the signalling TFCI, then the received radio packet is immediately decoded. A cyclic redundancy check (CRC) of the data of the received radio packet is then performed. If the CRC indicates that the data in the received radio packet contains errors, then the soft values of the received radio packet are stored in the buffer. Here, all old soft values that are stored in the buffer are overwritten by new soft values. If, on the other hand, the CRC indicates the data of the received radio packet does not contain errors, then all soft values are cleared from the buffer.

The present invention permits the misreading of the first and/or second TFCI of a signalling message while still providing accurate decoding of a transmitted radio packet. In addition, by permitting the correct processing of misread TFCIs on half rate channels, the invention can decode errors within the TCFI that precedes the signalling message without having an adverse impact on the signalling message.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE EXEMPLARY EMBODIMENTS

The present invention is a method for decoding signalling messages on Flexible Layer One (FLO) half rate channels. In accordance with the invention, the soft values of blocks that are incorrectly received are stored in a buffer. When the cyclic redundancy check (CRC) data of a received block fails, the soft values of the block are stored along with the first half of a signalling message so as to facilitate soft combining. In other words, when the first radio packet for which the transport format combination (TFC) is a signalling TFCI, i.e., equal to 0, the soft values and the first half of a signalling message are stored to permit soft combining of the data. A soft combination of data occurs when information from an original transmission is combined with the information contained in a subsequent transmission. In accordance with the invention, the information from the first half of a signalling message that is used in the combination is the first radio packet for which the TFCI is a signalling TFCI, i.e., its value is 0.

Figure 1:
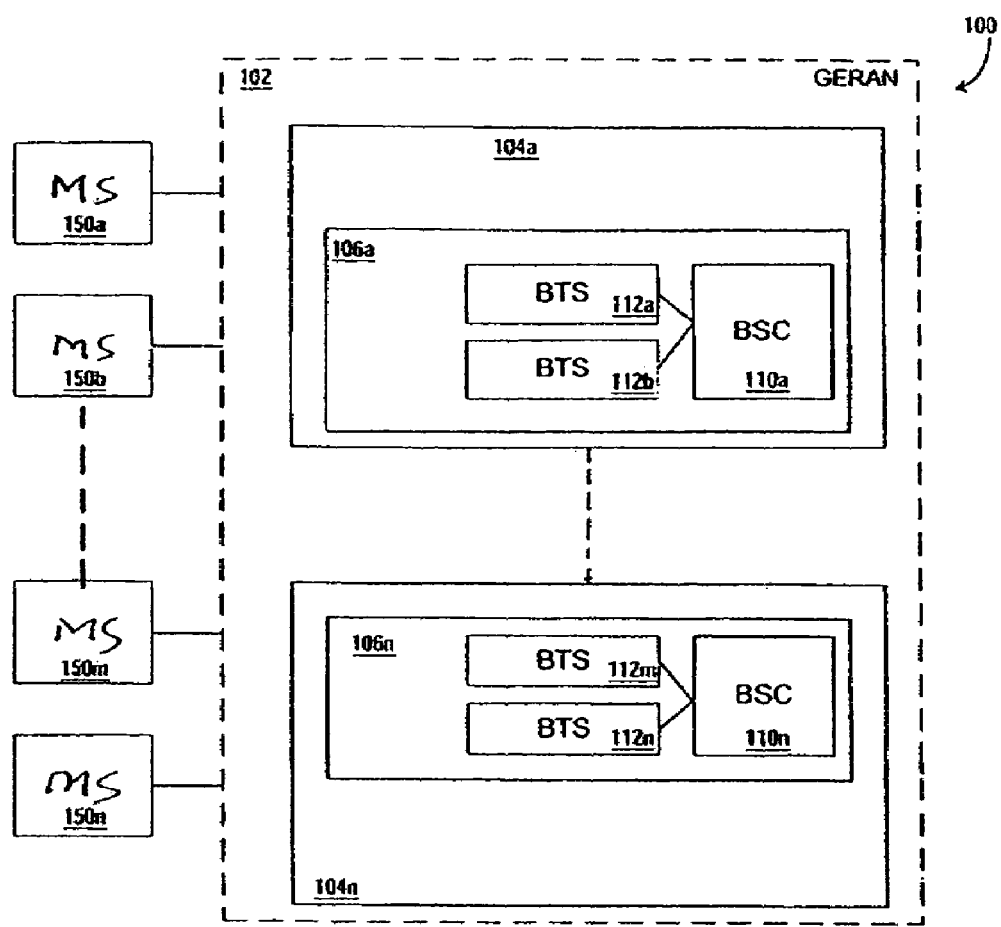
FIG. 1 is a block diagram illustrating a system in which the method of the invention is implemented.

FIG. 1 is a block diagram illustrating an exemplary system in which the method of the invention is implemented. With reference to FIG. 1, communications network 100 includes a combination of technologies and protocols, including packet-switched components and global system for mobile communication (GSM) components. As shown therein, network 100 includes a GSM/enhanced data rates for global evolution (EDGE) network (referred to as "GERAN" or element 102 of FIG. 1).

Network 100 is configured to facilitate communication by and among a number of mobile stations (MS) 150a-150n. MS 150a-150n may be any of a number of devices adapted to communicate over network 100, such as, for example mobile telephones, computing devices, workstations, or the like.

As depicted in FIG. 1, GERAN network 102 may include a number of base station subsystems (BSS) 106a-n. Although only two BSS 106a, 106n are depicted, those skilled in the art will appreciate that a typical network will include a number of BSS 106. Each BSS 106 may be associated with a particular communications cell 104 in network 100. Each BSS 106 typically includes a base station controller (BSC) 110 and one or more base transceiver systems (BTS) 112. Each BTS 112 operates in conjunction with one or more transmitters (not shown) which provide a bi-directional radio link to an individual MS 150. Communication links between BTS 112 and the MS 150 are controlled and managed by BSC 110, allowing communication by and among devices in the network.

Figure 2:
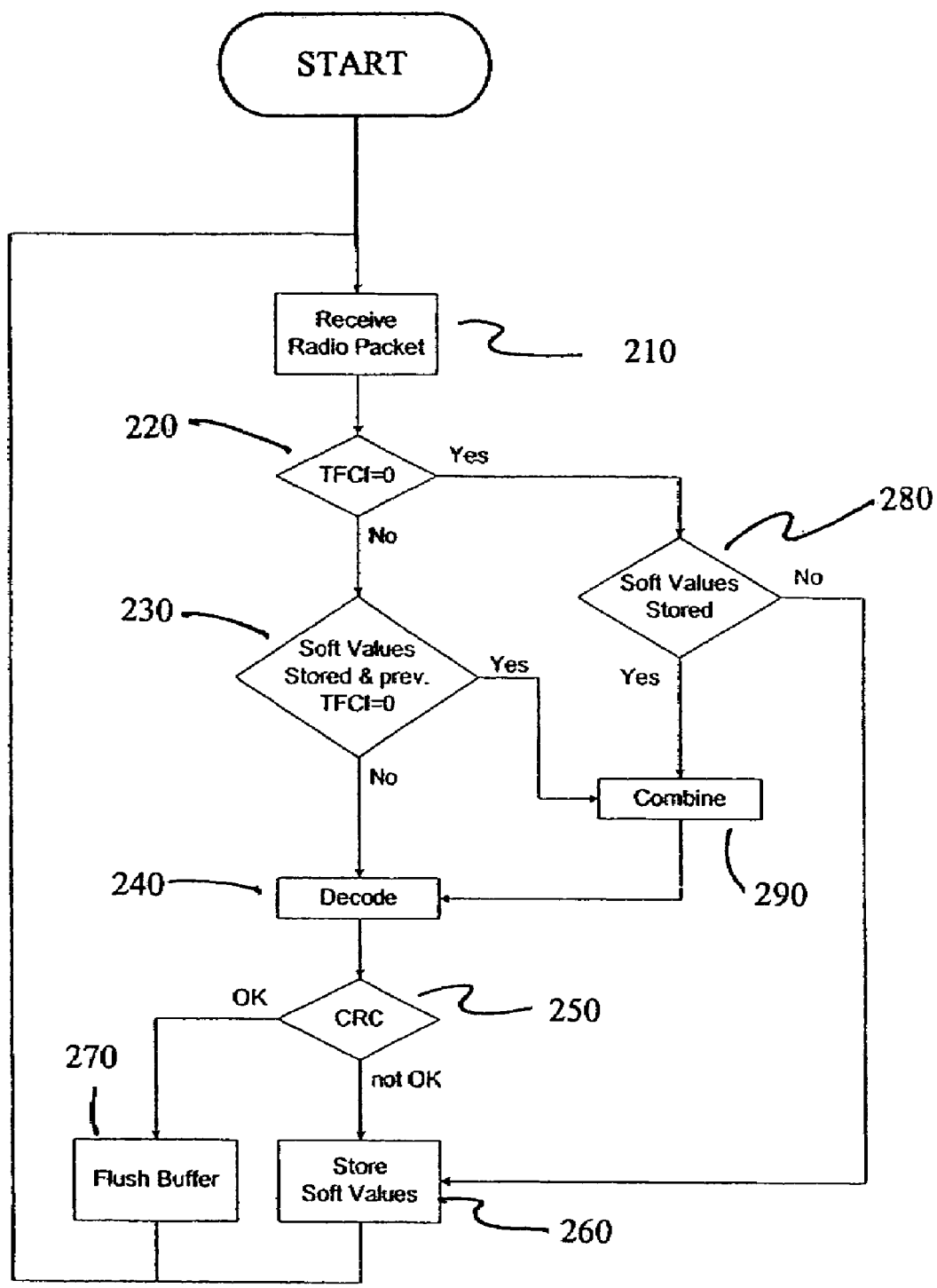
FIG. 2 is a flow chart illustrating the steps of the method in accordance with the invention.

FIG. 2 is a flow chart illustrating the steps of the method in accordance with the invention. With reference to FIG. 2, the method for decoding signalling messages on FLO half rate channels is implemented upon receiving a transmitted radio packet, as indicated in step 210.

A check of the first transport format combination indicator (TFCI) of the received radio packet is performed to determine its value, as indicated in step 220. If the value of the TFCI is 0, i.e., the TFCI is a signalling TFCI, then a check is performed to determine whether the current soft values of the received radio packet are stored in a buffer, as indicated in step 280. If the current soft values of the radio packet are stored in the buffer, then the current soft values of the received radio packet are combined with the soft values of the previous radio packet that are stored in the buffer, as indicated in step 290. On the other hand, if the current soft values of the received radio packet are not stored, then the current soft values are stored in the buffer, as indicated in step 260, and a return to step 210 occurs.

If the TFCI is not a signalling TFCI, then a check is performed to determine whether soft values of a previous radio packet are stored in the buffer and whether the previous TFCI was the signalling TFCI, i.e equal to 0, as indicated in step 230. If soft values of a previous radio packet are stored in the buffer and the previous TFCI is the signalling TFCI, then the soft values of the received radio packet are combined with the soft values of the previous radio packet that are stored in the buffer, as indicated in step 290, and the received radio packet is then decoded, as indicated in step 240.

If, however, the soft values of the previous radio packet are not stored in the buffer and the previous TFCI was not the signalling TFCI, then the received radio packet is immediately decoded, as indicated in step 240.

Next, a cyclic redundancy check (CRC) of the data of the received radio packet is performed, as indicated in step 250. If the CRC indicates that the data in the received radio packet contains errors, then the soft values of the received radio packet are stored in the buffer, as indicated in step 260. Here, all old soft values that are stored in the buffer are overwritten by new soft values. If, on the other hand, the CRC indicates the data of the received radio packet is okay, i.e. the received packet does not contains errors, then all soft values are cleared from the buffer, as indicated in step 270, and a return to step 210 occurs.

Table 1, Table 2 and Table 3 are exemplary illustrations of various results that are achieved when the method of the invention is implemented. In each Table, n indicates the TFCI which was sent is non signalling (i.e. the TFCI is not equal to 0), z indicates that the TFCI was misread or is unknown, x indicates that soft values are not stored. With reference to Table 1, shown therein are exemplary results that occur when decoding errors are not introduced into the radio packet. In the first column radio packet (RP) index indicates that a consecutive sequence of packets from 0 to 20 is transmitted. In the sent TFCI column, the value of the transmitted TFCI is indicated as either 0 or n. Table 1 indicates that when a TFCI with a 0 value is received (i.e., RP index 5), the values of the data at RP index 5 are stored subsequent to checking to determine whether the soft values of a previously received data packet were stored. Upon receipt of RP index 6, which indicates that the TFCI is a signalling TFCI, i.e. equal to 0, the stored soft values will be the soft values of RP index 5, which are then combined with the packets of RP index 6. This combined packet is then decoded based on the CRC indicating that the data was correctly received. Each time soft values are stored, the reception of data packets is recommenced, i.e., a pause is instituted with respect to decoding packets. As shown in Table 1, data in the radio packet is correctly decoded. In addition, all consecutive signalling messages are correctly processed.

TABLE 1

| RP index | Sent TFCI | Received TFCI | Soft Values Stored | Combine | Decode | CRC | Store Soft Values | Comments |
|---|---|---|---|---|---|---|---|---|
| 0 | n | n | x | No | yes | ok | | Decoding OK, clear buffer |
| 1 | n | n | x | No | yes | ok | | Decoding OK, clear buffer |
| 2 | n | n | x | No | yes | ok | | Decoding OK, clear buffer |
| 3 | n | n | x | No | yes | ok | | Decoding OK, clear buffer |
| 4 | n | n | x | No | yes | ok | | Decoding OK, clear buffer |
| 5 | 0 | 0 | x | No | wait | | 5 | store soft values and wait |
| 6 | 0 | 0 | 5 | Yes | yes | ok | | Combine, decoding OK, clear buffer |
| 7 | n | n | x | No | yes | ok | | Decoding OK, clear buffer |
| 8 | n | n | x | No | yes | ok | | Decoding OK, clear buffer |
| 9 | n | n | x | No | yes | ok | | Decoding OK, clear buffer |
| 10 | 0 | 0 | x | No | wait | | 10 | store soft values and wait |
| 11 | 0 | 0 | 10 | Yes | yes | ok | | Combine, decoding OK, clear buffer |
| 12 | 0 | 0 | x | No | wait | | 12 | store soft values and wait |
| 13 | 0 | 0 | 12 | Yes | yes | ok | | Combine, decoding OK, clear buffer |
| 14 | n | n | x | No | yes | ok | | Decoding OK, clear buffer |
| 15 | n | n | x | No | yes | ok | | Decoding OK, clear buffer |
| 16 | n | n | x | No | yes | ok | | Decoding OK, clear buffer |
| 17 | n | n | x | No | yes | ok | | Decoding OK, clear buffer |
| 18 | n | n | x | No | yes | ok | | Decoding OK, clear buffer |
| 19 | n | n | x | No | yes | ok | | Decoding OK, clear buffer |
| 20 | n | n | x | No | yes | ok | | Decoding OK, clear buffer |

Referring now to Table 2, shown therein are exemplary results that are achieved when a certain level of decoding errors are introduced into the received radio packets. As illustrated in Table 2, the error introduced for radio packet (RP) number 5 illustrates that the first TFCI of a signalling message can be missed, i.e. misread, as long as the second TFCI is properly decoded. In other words, even though the first TFCI is misread, the soft values are stored and utilized during the decoding of the radio packet when the second TFCI is correctly received. In addition, the error introduced for radio packet number 16 illustrates that if a TFCI is misread as the signalling TFCI (i.e., the TFCI is equal to 0), the next radio packet is also lost (number 17 in this example). Naturally, a person skilled in the art would readily appreciate that if the following radio packet is a signalling radio packet, then it will not be lost because soft values of the first radio packet will be stored due to the failed decoding.

TABLE 2

| RP index | Sent TFCI | Received TFCI | Soft Values Stored | Combine | Decode | CRC | Store Soft Values | Comments |
|---|---|---|---|---|---|---|---|---|
| 0 | n | n | x | no | yes | ok | | decoding OK, clear buffer |
| 1 | n | z | x | no | yes | nok | 1 | decoding not OK, store soft values |
| 2 | n | n | 1 | no | yes | ok | | soft values stored but previous TFCI not 0, no combining, decoding OK, clear buffer |
| 3 | n | n | x | no | yes | ok | | decoding OK, clear buffer |
| 4 | n | n | x | no | yes | ok | | decoding OK, clear buffer |
| 5 | 0 | z | x | no | yes | nok | 5 | decoding not OK, store soft values |
| 6 | 0 | 0 | 5 | yes | yes | ok | | combine, decoding OK, clear buffer Here, the first TFCI can be missed |
| 7 | n | n | x | no | yes | ok | | decoding OK, clear buffer |
| 8 | n | n | x | no | yes | ok | | decoding OK, clear buffer |
| 9 | n | n | x | no | yes | ok | | decoding OK, clear buffer |
| 10 | 0 | 0 | x | no | wait | | 10 | store soft values and wait |
| 11 | 0 | 0 | 10 | yes | yes | ok | | combine, decoding OK, clear buffer |
| 12 | 0 | 0 | x | no | wait | | 12 | store soft values and wait |
| 13 | 0 | 0 | 12 | yes | yes | ok | | combine, decoding OK, clear buffer |
| 14 | n | n | x | no | yes | ok | | decoding OK, clear buffer |
| 15 | n | n | x | no | yes | ok | | decoding OK, clear buffer |
| 16 | n | 0 | x | no | wait | | 16 | TFCI misunderstood, store soft values and wait |
| 17 | n | n | 16 | yes | yes | nok | 17 | soft values stored and previous TFCI misread as 0, combine, decoding not OK, store soft values |

TABLE 2-continued

| RP index | Sent TFCI | Received TFCI | Soft Values Stored | Combine | Decode | CRC | Store Soft Values | Comments |
|---|---|---|---|---|---|---|---|---|
| 18 | n | n | 17 | no | yes | ok | | Here, a TFCI that is misread as 0 triggers the loss of the following radio packet soft values stored but previous TFCI not 0, no combining, decoding OK, clear buffer |
| 19 | n | n | x | no | yes | ok | | decoding OK, clear buffer |
| 20 | n | n | x | no | Yes | ok | | decoding OK, clear buffer |

With reference to Table 3, shown therein are exemplary results that occur when a greater level of decoding errors are introduced into the radio packet. As shown in Table 3, the error introduced for radio packet number 6 illustrates that the second TFCI of a signalling message can be misread (e.g., received TFCI is indicated by z) when the first TFCI is properly decoded. In addition, the errors introduced for radio packets 9 and 15 illustrate that, even if the TFCI that precedes a specific signalling message is misread, the decoding of the specific signalling message is unaffected.

TABLE 3

| RP index | Sent TFCI | Received TFCI | Soft Values Stored | Combine | Decode | CRC | Store Soft Values | Comments |
|---|---|---|---|---|---|---|---|---|
| 0 | n | n | x | no | yes | ok | | decoding OK, clear buffer |
| 1 | n | n | x | no | yes | ok | | decoding OK, clear buffer |
| 2 | n | n | x | no | yes | ok | | decoding OK, clear buffer |
| 3 | n | n | x | no | yes | ok | | decoding OK, clear buffer |
| 4 | n | n | x | no | yes | ok | | decoding OK, clear bufferz |
| 5 | 0 | 0 | x | no | wait | | 5 | store soft values and wait |
| 6 | 0 | z | 5 | yes | yes | ok | | soft values values stored and previous TFCI was 0, combine, decoding OK, clear buffer In this case, the second TFCI can be missed |
| 7 | n | n | x | no | yes | ok | | decoding OK, clear buffer |
| 8 | n | n | x | no | yes | ok | | decoding OK, clear buffer |
| 9 | n | z | x | no | yes | nok | 9 | decoding not OK, store soft values |
| 10 | 0 | 0 | 9 | no | yes | nok | 10 | combine, decoding not OK, store soft values |
| 11 | 0 | 0 | 10 | yes | yes | ok | | combine, decoding OK, clear buffer |
| 12 | 0 | 0 | x | no | wait | | 12 | store soft values and wait |
| 13 | 0 | 0 | 12 | yes | yes | ok | | combine, decoding OK, clear buffer |
| 14 | n | n | x | no | yes | ok | | decoding OK, clear buffer |
| 15 | n | 0 | x | no | yes | ok | 15 | TFCI misunderstood, store soft values and wait |
| 16 | 0 | 0 | 15 | no | yes | nok | 16 | combine decoding not OK, store soft values |
| 17 | 0 | 0 | 16 | yes | yes | ok | | combine, decoding OK, clear buffer |
| 18 | n | n | x | no | yes | ok | | decoding OK, clear buffer |
| 19 | n | n | x | no | yes | ok | | decoding OK, clear buffer |
| 20 | n | n | x | no | yes | ok | | decoding OK, clear buffer |

Using the method of the invention, it is advantageously possible to miss the first and second TFCI of a signalling message without adversely affecting the decoding of a transmitted radio packet. In addition, it is advantageously possible to decode errors on the TFCI preceding the signalling message without having an adverse impact on the signalling message.

Another exemplary embodiment in accordance with this invention is a computer program product for use in a system for decoding a transport block of signalling messages, the computer program product comprising a computer usable medium having computer readable program code thereon, the computer readable program code comprising: program code receiving a transmitted radio packet for decoding; program code checking a first transport format combination indicator (TFCI) of the received radio packet to determine whether the TFCI is a signalling TFCI; program code determining whether soft values of a previously received radio packet have been stored in a buffer if the TFCI is a signalling TFCI; program code combining the soft values of the previously received radio packet with the soft values of a currently received radio packet to generated a combined data packet if the soft values of the previously received radio packet are stored in the buffer; program code decoding the combined data packet to obtain a decoded radio packet; program code determining whether data within the decoded radio packet is error free; and program code clearing the buffer if the data within the decoded radio packet is error free.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
  receiving with a wireless receiver a transmitted radio packet for decoding;
  checking a first transport format combination indicator of the received radio packet to determine whether the first transport format combination indicator is a signalling transport format combination indicator;
  in response to a determination that the first transport format combination indicator is a signaling transport format combination indicator, combining soft values of a previously received radio packet with soft values of the currently received radio packet to generate a combined data packet;
  decoding the combined data packet to obtain a decoded radio packet; and
  determining whether data within the decoded radio packet is error free.

2. The method of claim 1, further comprising:
  determining whether a transport format combination indicator of the previously received transmitted radio packet is a signalling transport format combination indicator; and
  in response to a determination that the transport format combination indicator of the previously received transmitted radio packet is a signaling transport format combination indicator, combining the soft values of the currently received radio packet with the soft values of the previously received radio packet.

3. The method of claim 2, wherein the signalling transport format combination indicator has a value of 0.

4. The method of claim 1, further comprising storing soft values of the currently received radio packet if the currently received radio packet contains errors.

5. The method of claim 1, wherein the signalling transport format combination indicator has a value of 0.

6. The method of claim 1, wherein said determining whether data within the decoded radio packet is error free comprises performing a cyclic redundancy check of data within the currently received data packet.

7. The method of claim 6, wherein previous soft values of the previously received radio packet are overwritten with new soft values if data in the received packet contains errors.

8. The method of claim 1, wherein previous soft values of the previously received radio packet are overwritten with new soft values if data in the currently received packet contains errors.

9. The method of claim 1, wherein a transport format combination indicator of the previously received radio packet is checked to determine whether the transport format combination indicator is a signalling transport format combination indicator.

10. A system comprising:
  means for receiving a transmitted radio packet for decoding;
  checking means for determining whether a first transport format combination indicator of a currently received radio packet is a signalling transport format combination indicator;
  means for storing soft values;
  combining means for combining soft values of the currently received radio packet with soft values of a previously received radio packet to generate a combined data packet; and
  decoding means for decoding the combined data packet and determining whether data within a decoded radio packet is error free.

11. The system of claim 10, wherein said checking means is further for determining whether a transport format combination indicator of a previously received radio packet is a signalling transport format combination indicator, and
  the combining means is further for combining the soft values of the currently received radio packet with the soft values of the previously received radio packet in the response to a determination that the transport format combination indicator of the previously received radio packet is a signalling transport format combination indicator.

12. The system of claim 11, wherein the signalling transport format combination indicator has a value of 0.

13. The system of claim 11, wherein said decoding means is further for performing a cyclic redundancy check of data within the currently received data packet when determining whether data within the decoded radio packet is error free.

14. The system of claim 13, wherein the storing means is further for overwriting previous soft values of the previously received radio packet with new soft values if data in the currently received packet contains errors.

15. The system of claim 11, wherein the storing means is further for overwriting previous soft values of the previously received radio packet with new soft values if data in the currently received packet contains errors.

16. The method of claim 10, wherein the storing means is further for storing soft values of the currently received radio packet if the currently received radio packet contains errors.

17. The system of claim 16, wherein the signalling transport format combination indicator has a value of 0.

18. A controller comprising:
  a receiver configured to receive transmitted radio packets for decoding in the controller;
  a checking module configured to check whether a first transport format combination indicator of a currently received radio packet is a signalling transport format combination indicator;
  a module configured to store soft values of a received radio packet;
  a module configured to combine the soft values of the currently received radio packet with the soft values of a previously received radio packet to generate a combined data packet; and
  a decoding module configured to decode the combined data packet and determining whether data within a decoded radio packet is error free.

19. The controller of claim 18, wherein the controller is a base station subsystem.

20. The controller of claim 18, wherein
said checking module is configured to determine whether a transport format combination indicator of a previously received radio packet is a signalling transport format combination indicator and
the combining module is configured to combine the soft values of the currently received radio packet with the soft values of the previously received radio packet in response to a determination that the transport format combination indicator of the previously received radio packet is a signalling transport format combination indicator.

21. The controller of claim 20, wherein the signalling transport format combination indicator has a value of 0.

22. The controller of claim 20, wherein said the checking module is configured to perform a cyclic redundancy check of data within the currently received data packet when determining whether data within the decoded radio packet is error free.

23. The controller of claim 22, wherein the storing module is configured to overwrite previous soft values of the previously received radio packet are with new soft values if data in the currently received packet contains errors.

24. The controller of claim 20, wherein the storing module is configured to overwrite previous soft values of the previously received radio packet with new soft values of data in the currently received packet contains errors.

25. The controller of claim 18, wherein soft values of the currently received radio packet are stored if the currently received radio packet contains errors.

26. The controller of claim 25, wherein the signalling transport format combination indicator has a value of 0.

27. An apparatus comprising:
a buffer configured to store soft values;
a receiver configured to receiver a decision from a controller; said decision indicating whether a first transport format combination indicator of a currently received radio packet is a signalling transport format combination indicator and when the transport format combination indicator is a signalling transport format combination indicator, whether soft values of a previously received radio packet have been stored;
the receiver further configured to receive combined soft values included in a combined data packet from the controller based on the decision received from the controller; and
a decoder configured to decode the combined data packet and to determine whether data within a decoded radio packet is error free.

28. The apparatus of claim 27, wherein the buffer is configured to store soft values of the currently received radio packet if the currently received radio packet contains errors.

29. The apparatus of claim 27, wherein the buffer is configured to overwrite previous soft values of the previously received radio packet with new soft values if data in the currently received packet contains errors.

30. The apparatus of claim 27, wherein a first transport format combination indicator of the currently received radio packet is checked to determine whether the transport format combination indicator is a signalling transport format combination indicator.

31. The apparatus of claim 30, wherein the signalling transport format combination indicator has a value of 0.

32. The apparatus of claim 27, wherein the apparatus is a base station transceiver.

33. A computer program product for use in a system for decoding a transport block of signalling messages, the computer program product comprising a computer usable medium having computer readable program code thereon, the computer readable program code comprising:
program code receiving a transmitted radio packet for decoding;
program code checking a first transport format combination indicator of the received radio packet to determine whether the transport format combination indicator is a signalling transport format combination indicator;
program code combining the soft values of a previously received radio packet with the soft values of a currently received radio packet to generate a combined data packet in response to a determination that the transport format combination indicator of the received transmitted radio packet is a signaling transport format combination indicator;
program code decoding the combined data packet to obtain a decoded radio packet; and
program code determining whether data within the decoded radio packet is error free.

34. An apparatus comprising:
means for receiving a decision from a controller; said decision indicating whether a first transport format combination indicator of a currently received radio packet is a signalling transport format combination indicator and when the transport format combination indicator is a signalling transport format combination indicator, whether soft values of a previously received radio packet have been stored;
means for receiving combined soft values included in a combined data packet from the controller based on the decision received from the controller;
means for decoding the combined data packet; and
means for determining whether data within a decoded radio packet is error free.

35. The apparatus of claim 34, wherein the apparatus is a base station transceiver.

* * * * *